United States Patent [19]

Schnell

[11] 4,159,250
[45] Jun. 26, 1979

[54] DIALYZER CASING

[75] Inventor: William J. Schnell, Wheeling, Ill.

[73] Assignee: Baxter Travenol Laboratories, Inc., Deerfield, Ill.

[21] Appl. No.: 895,428

[22] Filed: Apr. 12, 1978

Related U.S. Application Data

[63] Continuation of Ser. No. 732,233, Oct. 14, 1976, abandoned.

[51] Int. Cl.² ............ B01D 25/02; B01D 31/00; B29C 27/04
[52] U.S. Cl. .................. 210/232; 210/321 B; 206/449; 206/597; 220/4 E; 156/73.1
[58] Field of Search ............ 210/232, 321 B, 346, 210/433 M, 321 A, 321 R; 55/16, 158; 206/449, 454, 597, 602; 220/4 B, 4 E, 85 B; 156/73.1

[56] References Cited
U.S. PATENT DOCUMENTS

| | | | |
|---|---|---|---|
| 3,111,489 | 11/1963 | Getzin | 210/232 |
| 3,464,562 | 9/1969 | Meyers et al. | 210/346 |
| 3,485,902 | 12/1969 | Critchell | 210/346 |
| 3,805,960 | 4/1974 | Butruille et al. | 210/321 B |
| 3,962,075 | 6/1976 | Fialkoff et al. | 210/22 A |
| 4,039,455 | 8/1977 | Bardin et al. | 210/321 A |

Primary Examiner—Charles N. Hart
Assistant Examiner—David R. Sadowski
Attorney, Agent, or Firm—Paul C. Flattery; George S. Gerstman

[57] ABSTRACT

A dialysis device of the type including a stack of parallel membrane support plates and membranes. A casing encloses the top, bottom and two opposing sides of the stack with the casing formed of two plastic molded interchangeable parts. Each casing part comprises a base member and a pair of integrally formed arms extending from opposite sides of the base member. The two parts are connected so that the pair of arms extending from one base member is sonic welded to the other base member, enabling a pressure fit that is suited to the stack that is being enclosed by the casing.

Each base member includes hollowed-out portions defined by ribs with an overlying plate scan-welded thereto to form a sealed, rigid unit that is efficient to manufacture.

15 Claims, 13 Drawing Figures

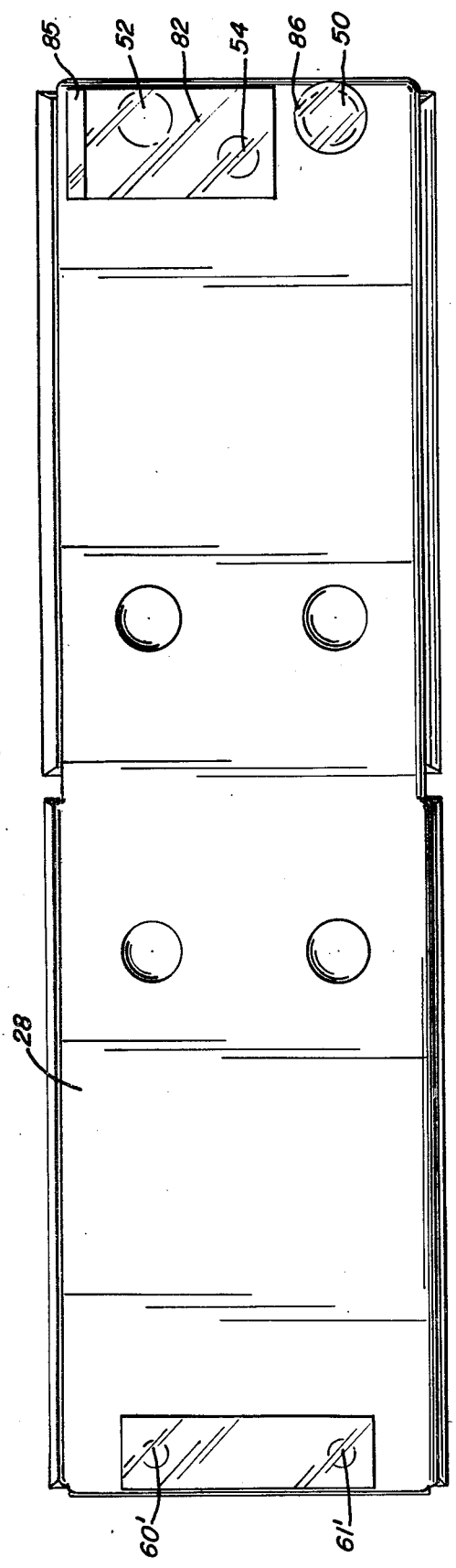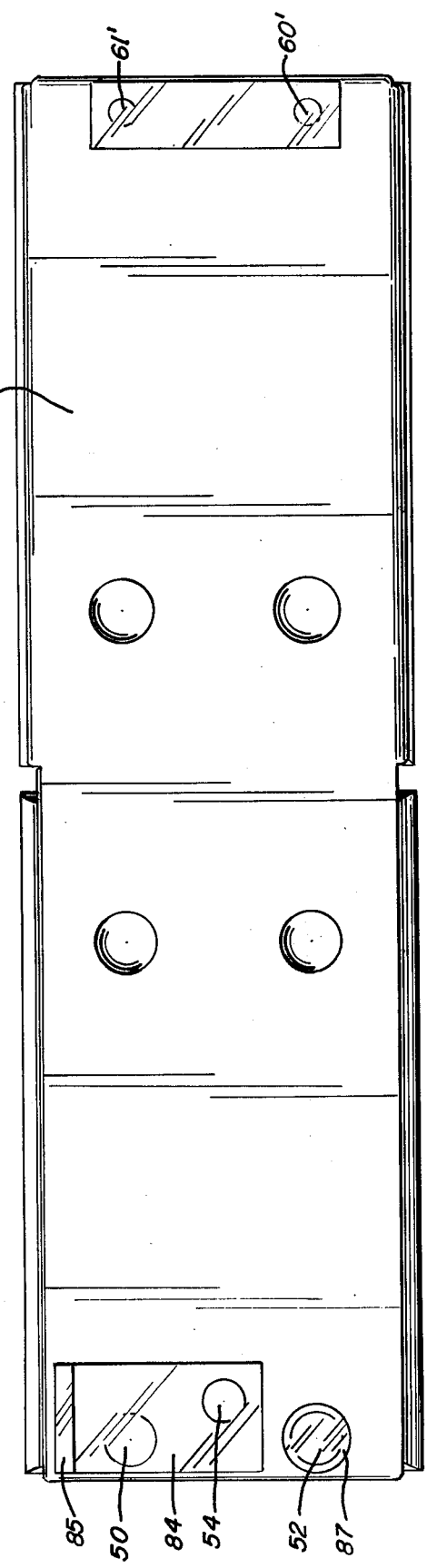

DIALYZER CASING

This is a continuation of application Ser. No. 732,233, filed Oct. 14, 1976.

BACKGROUND OF THE INVENTION

This invention relates to a dialysis device, and more particularly, to an improved casing; for partially enclosing a stack formed of a plurality of parallel membrane support plates and membranes.

In U.S. Pat. application Ser. No. 732,232 filed on the same day as this application in the names of Jimmy L. Miller and William J. Schnell, entitled "Distribution System For Blood Treatment Apparatus" and assigned to the assignee of the present invention, there is disclosed an apparatus for dialyzing or oxygenating blood utilizing the transfer of fluid through a membrane. As disclosed in that patent application, a plurality of membrane support plates are provided with each membrane support plate supporting a membrane on opposite sides thereof. A blood path is formed between adjacent membranes and a dialysate path is formed between adjacent membranes and its respective membrane support plate. In the illustrative embodiment, the membranes and membrane support plates form a generally rectilinear stack. Although no limitation is intended, the present invention is well suited for use as a casing to enclose the rectilinear stack of membranes and membrane support plates disclosed in the above-identified patent application.

The U.S. patent to Riede, et al. U.S. Pat. No. 3,734,298 discloses a casing for use with a stack of membranes and membrane support plates. The casing disclosed therein is formed of a pair of clamping plates and clamping rails which dovetail into grooves provided along the sides of the clamping plates. However, while the size of the stack of membranes and membrane support plates may vary somewhat, the casing size is fixed and invariable. Thus the pressure of the casing upon the membranes and membrane support plates may be too great or too small depending upon the thickness of the stack of membranes and membrane support plates enclosed by the casing. As a result, the distances between the membrane support surfaces of the membrane support plates may vary from one dialysis device to another because of the possible variation in the forces exerted by the casing against the stack.

In contrast, the present invention provides a casing which permits the proper pressure to be exerted on the sealing surfaces of the membranes and plates. This results in a predetermined sealing force and the membrane support surfaces of the membrane support plates will be spaced a predetermined distance from each other, thereby permitting a constant priming volume in the blood compartment of the dialyzer.

It is, therefore, an object of the invention to provide a casing having variable dimensions during construction thereof, whereby appropriate pressure on the stack of membranes and membrane support plates can be applied.

Another object of the present invention is to provide a casing which permits a constant priming volume in the blood compartment of a dialyzer.

A further object of the present invention is to provide a casing which is simple in construction and efficient to manufacture.

To this end, among other things the casing has hollowed-out portions defined by ribs which aid in maintaining the rigidity of the unit. A separate plate overlies the ribs and is scan-welded to the device to form a very rigid unit that is effectively sealed and is economical and efficient to produce.

Other objects and advantages of the pesent invention will become apparent as the description proceeds.

SUMMARY OF THE INVENTION

In accordance with the present invention, there is provided a dialysis device of the type in which a plurality of parallel membrane support plates are stacked and support a plurality of membranes, with the membrane support plates and membranes defining transverse openings for the passage of fluid. The improvement comprises a casing enclosing the top, bottom and two opposing sides of the stack.

In the illustrative embodiment, the casing comprises a first base member carrying a side member extending therefrom and a second base member carrying a side member extending therefrom. The first base member and the second base member are located on opposed portions of the stack with their side members extending toward each other on other opposed portions of the stack. The side member carried by the first base member is connected to the second base member and the side member carried by the second base member is connected to the first base member.

The first base member and the second base member are movable toward each other during connection of the side members to the base members. In this manner, the distance between the first base member and the second base member is variable during construction of the casing to provide a suitable pressure fit on the membrane stack enclosed by the casing.

In the illustrative embodiment, each of the side members comprise a pair of arms integrally formed with the respective base member and extending from opposite sides of the respective base member. The first and second base members and their side members are identical, interchangeable and molded from plastic material.

In the illustrative embodiment, each base member has hollowed-out portions defined by opposed sides, opposed ends and transverse ribs, with a generally planar plate overlying the sides, ends and ribs for rigidifying the base member. The planar plates have energy directors which face the sides, ends and ribs and are ultrasonically scan-welded to form a sealed, rigid unit that is efficient to manufacture.

A more detailed explanation of the invention is provided in the following description and claims, and is illustrated in the accompanying drawings.

BRIEF DESCRIPTION OF THE DRAWINGS

FIG. 12 is a top plan view of the device of FIG. 1; and

FIG. 13 is a bottom plan view thereof.

DETAILED DESCRIPTION OF THE ILLUSTRATIVE EMBODIMENT

Figure 1:
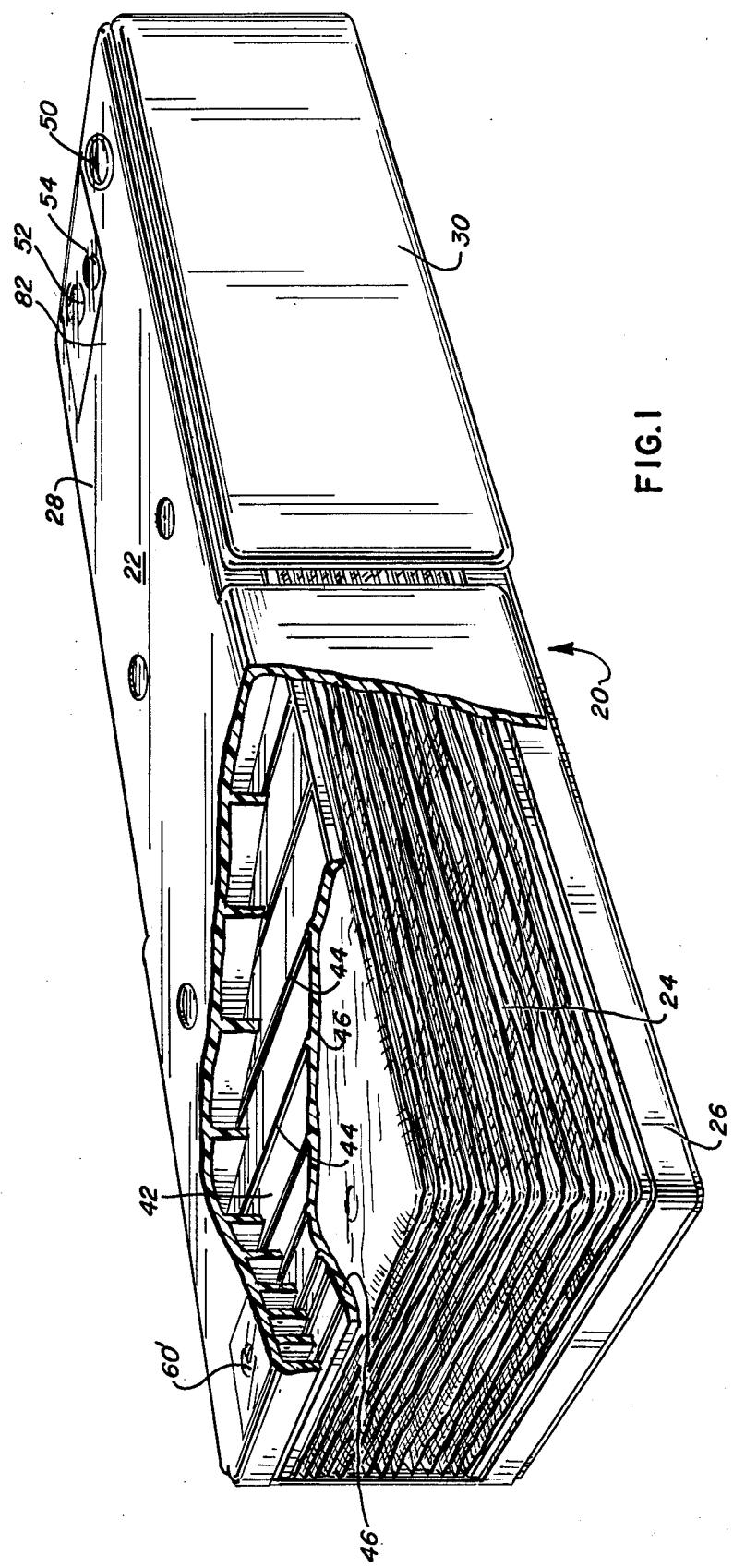
FIG. 1 is a perspective view, with a portion broken away for clarity, of a dialysis device constructed in accordance with the principles of the present invention.

Referring to the Figures, a dialysis device 20 is shown which comprises a casing 22 enclosing a portion of a stack 24. Stack 24 comprises a plurality of membrane support plates and membranes, as is known in the dialysis art. The membrane support plates and membranes forming stack 24 are of the parallelly positioned type and, although no limitation is intended, may comprise the membrane and membrane stack disclosed in copending U.S. application Ser. No. 732,232, filed on the same day as this application in the names of Jimmy L. Miller and William J. Schnell, entitled "Distribution System For Blood Treatment Apparatus" and assigned to the assignee of the present invention.

Casing 22 basically includes two identical interengaging base members 26 and 28, each of which carries a side member extending therefrom. Thus base member 26 carries a side member which includes two arms 30, 32 integrally molded with the base member 26 and extending from opposite sides of the base member. Likewise, identical base member 28 includes two integrally molded arms extending from opposite sides of base member 28. Base members 26 and 28 are interchangeable with each other because they are identical, and therefore manufacture of such a base member and its extending arms is very economical.

Figure 2:
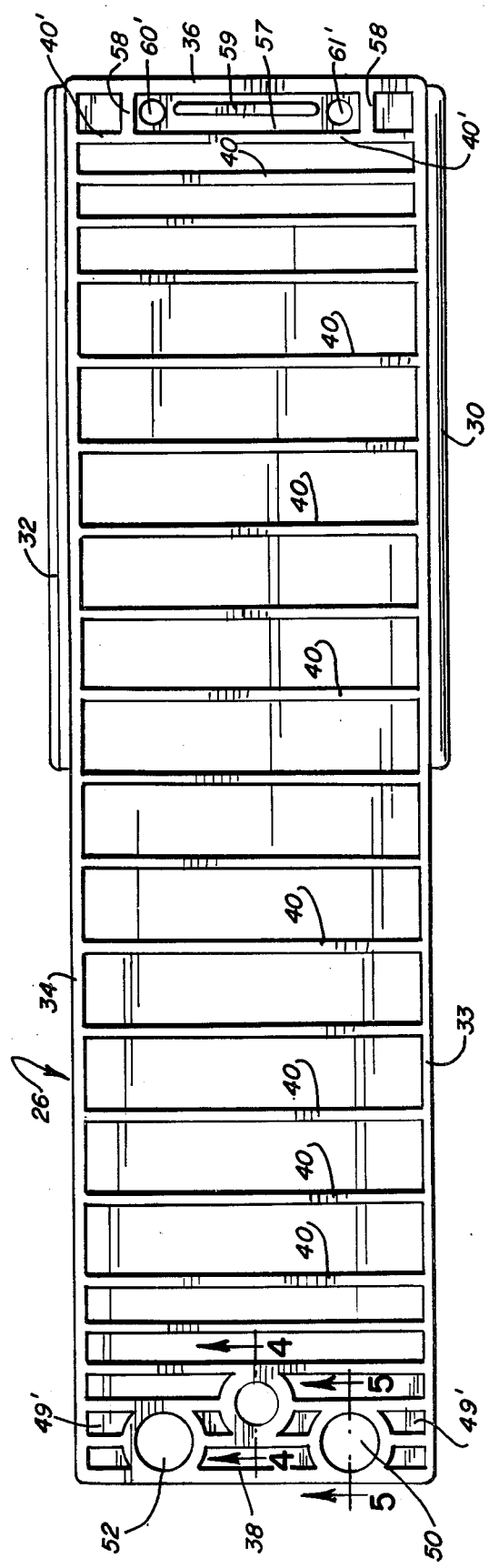
FIG. 2 is a top plan view of a portion of the casing of the dialysis device of FIG. 1.
Figure 3:
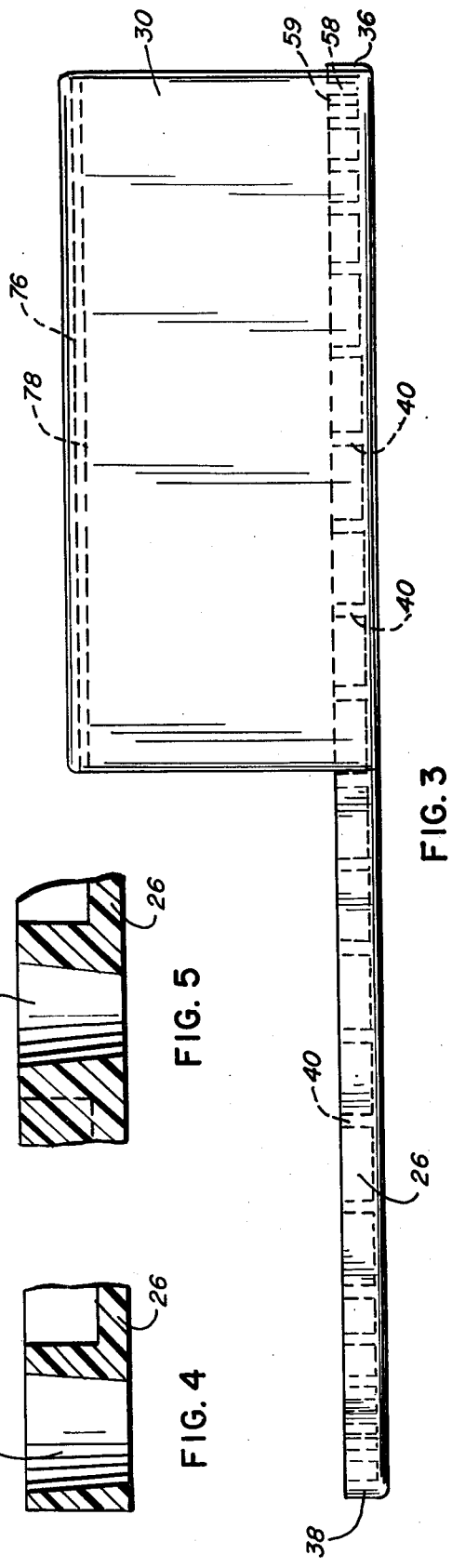
FIG. 3 is a side elevational view thereof.
Figure 5:
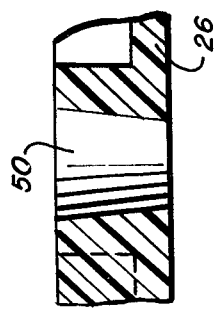
FIG. 5 is a fragmentary, cross-sectional view thereof, taken along the line 5—5 of FIG. 2.
Figure 4:
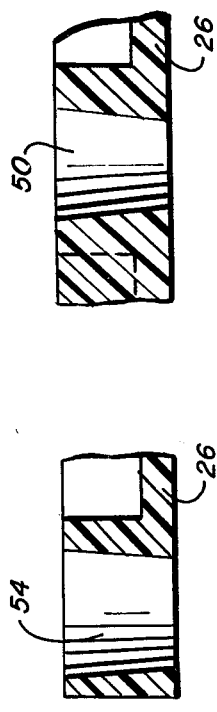
FIG. 4 is a fragmentary cross-sectional view thereof, taken along the plane of the line 4—4 of FIG. 2.
Figure 6:
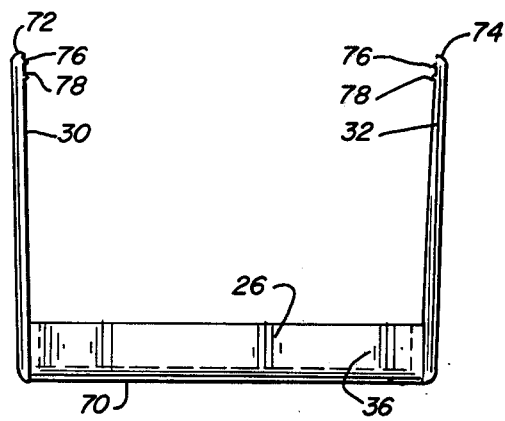
FIG. 6 is an end view of the device of FIG. 3, taken from the right end of FIG. 3.
Figure 7:
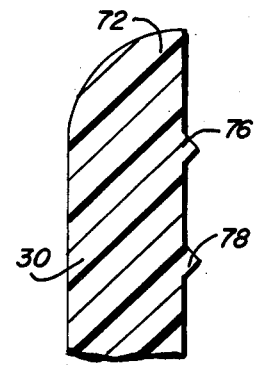
FIG. 7 is a fragmentary, greatly enlarged view of a portion of the left extending arm of the device of FIG. 6.

Base member 26 includes a pair of opposed sides 33, 34 extending upwardly only a portion of the distance of extension of arms 30, 32, and a pair of opposed ends 36, 38 extending upwardly to the same extent as the upward extension of opposed sides 33, 34. In order for the structure to be rigid, a number of transverse ribs 40, lying parallel to opposed ends 36, 38 and normal to opposed sides 33 and 34 are formed with the base member, as shown most clearly in FIGS. 2 and 3. Transverse ribs 40 are equal in height to sides 32, 33 and ends 36, 38 and ribs 40 form a support for a plate 42, most clearly shown in FIGS. 8 and 9. Plate 42 has substantially the same overall planar dimensions as base member 26 and is formed of a plastic molded part. Plate 42 comprises energy directors 44, 45 and 47 and a generally planar surface 46 which planar surface 46 engages stack 24.

By using plate 42, the unit is greatly rigidified. Such a rigid case is necessary in order to maintain a flat blood film. Otherwise, the stack of membranes and membrane support plates may cause the casing to flex, resulting in a non-uniform blood film across the plates.

Further, the use of plate 42 in cooperation with base member 26 permits using less plastic in the base member, permits the use of cheaper plastic in the base member and thus the overall cost of the unit can be reduced.

Base member 26 defines a pair of dialysate openings 50, 52 and a blood flow opening 54 which communicates with similar openings defined by stack 24. Likewise, plate 42 defines openings 50', 52' which communicate with openings 50 and 52 of base member 26 and plate 42 also defines a blood flow opening 54' which communicates with blood flow opening 54 of base member 26. Openings 50' and 52' are formed as the bores of nipples 50" and 52" and opening 54' is formed as the bore of nipple 54'". These nipples sealingly engage respective openings 50, 52 and 54 when plate 42 is interengaged with base member 26.

Base member 26 also has a trough 57 defined on one side by rib 40', on the opposite side by end 36 and on its ends by ribs 58 which bridge rib 40' and end 36. Ribs 58 are equal in height to ribs 40, rib 40' and end 36. A member 59, equal in height to ribs 58, is centrally located within trough 57.

Thus base member 26 and its associated arms 30, 32 is an integrally molded unit and plate 42 is a separately formed molded plastic unit. Plate 42 is placed upon base member 26 so that the energy directors 44 face ribs 40, energy directors 45 face sides and ends 33, 34, 36 and 38 and energy directors 47 face rib 40', ribs 58 and member 59. The nipples interengage the openings of base member 26, and plate 42 and base member 26 are then ultrasonically scan-welded to form a complete unit.

It is to be understood that other means of connecting plate 42 to base member 26 could be used, although ultrasonic scan-welding has been found most effective. For example, a connection using adhesive has been found disadvantageous because the adhesive is typically difficult to handle, often provides a relatively messy environment and takes a relatively long time to be complete. However, under certain circumstances the use of adhesive may be satisfactory.

Vibration welding has also been attempted, but it has been found that a large amount of flash (overhanging plastic) results from the use of vibration welding. However, this technique may be satisfactorily employed under certain circumstances.

In using scan-welding, a relatively neat, rapid system is achieved. In a specific example, 20 kilohertz was used with energy directors 44 overlying transverse ribs 40, and energy directors 45 overlying sides 33, 34 and ends 36, 38. Plate 42 and base member 26 fused together to form an extremely secure seal.

Figure 8:
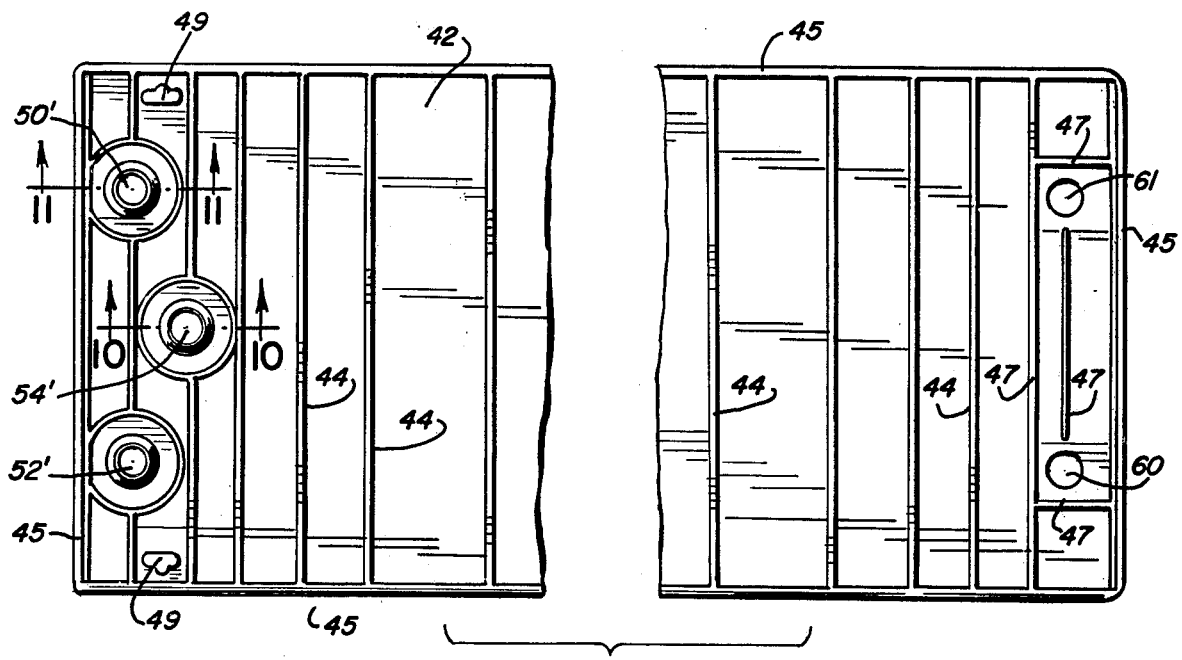
FIG. 8 is a fragmentary view of a portion of the dialysis device of FIG. 1.
Figure 9:
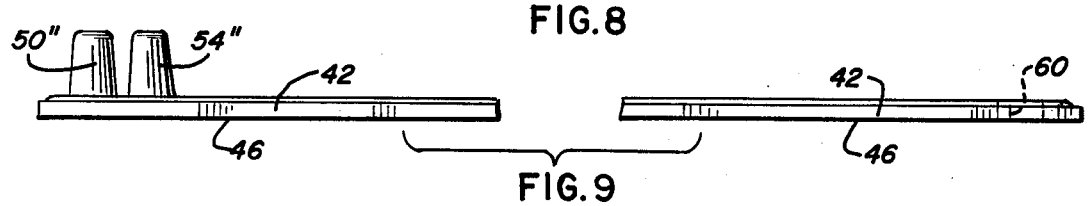
FIG. 9 is a side elevational view thereof.
Figure 11:
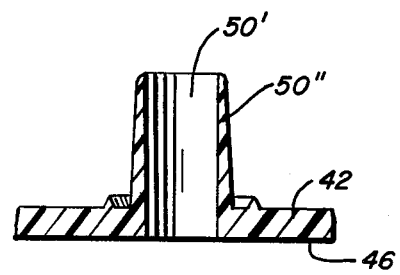
FIG. 11 is a fragmentary cross-sectional view, taken along the plane of the line 11—11 of FIG. 8.
Figure 10:
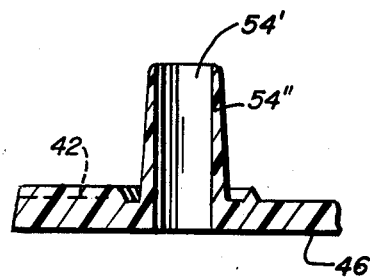
FIG. 10 is a fragmentary cross-sectional view thereof, taken along the plane of the line 10—10 of FIG. 8.

As shown most clearly in FIG. 8, a pair of upstanding members 49 are provided as alignment devices. Members 49 fit into openings 49' (FIG. 2) defined by ribs 40 and sides 33 of base member 26. This alignment action is useful notwithstanding the particular type of means used to connect plate 42 to base member 26.

Plate 42 defines openings 60 and 61 which overlie openings 60' and 61' of base member 26 when the plate 42 is connected to base member 26. Openings 60' and 61' are used for receiving stacking pins during construction of the units.

An identical plate 42 is likewise ultrasonically scan-welded to base member 28 so that the resulting base members and their associated arms and plates are identical to each other.

It is preferred that arms 30, 32 be angled slightly with respect to each other instead of being exactly parallel to each other, for ease in interconnection of the base members. Thus it is preferred that arm 30 extend at approximately 91.5° with respect to horizontal undersurface 70 of base member 26 and likewise, that arm 32 also extend at approximately 91.5° with respect to horizontal underside 70. The distal ends 72, 74 of arms 30, 32, respectively, have parallel ridges 76, 78 which aid in the ultrasonic welding of the arms to the other base member, as is well-known in the ultrasonic welding art.

Stack 24 is positioned between a pair of base members, 26, 28, each having extending arms and having plates 42 connected to them. The base members are interengaged with each other so that distal ends 70, 74 of the arms carried by one base member engage the other base member. An appropriate clamping pressure is provided against the external surfaces of the base members in the direction normal to the stack so that the desired sealing force is effected and the membrane support surfaces of the membrane support plates are spaced a predetermined distance from each other. The distal ends of the arms are then ultrasonically welded to the other base member to which they engage, while appropriate external forces urge the distal ends of the arms against the adjacent base members.

It can be seen that the casing size is not fixed, but instead the distance between base members 26 and 28 is variable depending upon the specific size of stack 24 and the desired pressure to be exerted against the stack. Thus a predetermined sealing force may be provided, thereby permitting a constant priming volume in the blood compartment of the dialyzer.

After the casing is formed on the stack 24, the unit is sterilized. To this end, immediately after construction of the casing, a pressure-sensitive tape strip 82, formed of Tyvek ® material, is fastened to base member 28 to overlie openings 52 and 54, as shown in FIGS. 1 and 12. Likewise, a pressure-sensitive tape strip 84, formed of Tyvek ® material, is fastened to base member 26 to overlie openings 50 and 54, as shown in FIG. 13. Further, sealing tape or foil 86 is used to seal opening 50 of base member 28 and sealing tape or foil 87 is used to seal opening 52 of base member 26. In addition, openings 60' and 61' of the base members are sealed by a suitable tape or foil. For example, the foil used to seal openings 60' and 61' could be a brand label or the like.

Tyvek ® tape strips 82 and 84 each include a tear strip 85 for ease in removing the Tyvek ® strips. When the unit is about to be used, the Tyvek ® strips are removed and a dialysate inlet member is connected to opening 52 of base member 28 with a dialysate outlet member connected to opening 50 of base member 26. A blood inlet member is connected to opening 54 of base member 26 and a blood outlet member is connected to blood outlet 54 of base member 28.

Thus dialysate enters port 52, flows through the stack of membranes and membrane support plates and will flow between the membranes and membrane support plates across to the opposite side of the dialyzer where it will outlet via port 50. In addition to the dialysate flow path provided between the membranes and membrane support plates, a flow path is provided through dialysate inlet 52, through the stack of membranes and membrane support plates, through opening 60, across rough 57, through opening 61 and up through the stack of membranes and membrane support plates. Dialysate flow is also provided at the other side of the dialyzer, through the stack of membranes and membrane support plates, through opening 60, via trough 57, through opening 61, through the stack, through opening 50' and out via outlet 50. The dialysate flow just described is additional to the dialysate flow which occurs from near one end of the stack to near the other end, between the membranes and their respective membrane support plates, countercurrent to the blood flow between the membranes.

Although an illustrative embodiment of the invention has been shown and described, it is to be understood that various modifications and substitutions may be made without departing from the novel spirit and scope of the present invention.

What is claimed is:

1. A dialysis device of the type in which a plurality of parallel membrane support plates are stacked and support a plurality of membranes, with the membrane support plates and membranes defining transverse openings for the passage of fluids, the improvement comprising, in combination: a casing enclosing the top, bottom and two opposing sides of said stack, said casing comprising a first base member carrying a side member extending therefrom, a second base member carrying a side member extending therefrom, said first and second base members and their side members being identical to each other and interchangeable, said first base member and said second base member being located on opposed portions of said stack with said side members extending toward each other on other opposed portions of said stack, said side member carried by said first base member being connected to said second base member and said side member carried by said second base member being connected to said first base member; said first base member and said second base member being movable toward each other during connection of said side members to said base members whereby the distance between said first base member and said second base member may provide a suitable pressure fit on said stack enclosed by said casing.

2. A dialysis device as described in claim 1, wherein each of said side members comprise a pair of arms integrally formed with the respective base member and extending from opposite sides of the respective base member.

3. A dialysis device as described in claim 2, wherein each said base member and exending arms form a generally U-shaped cross-sectional configuration.

4. A dialysis device as described in claim 2, wherein said pair of arms carried by said first base member are sonic welded to said second base member and said pair of arms carried by said second base member are sonic welded to said first base member.

5. A dialysis device as described in claim 1, wherein said base members define openings which communicate with said transverse openings.

6. A dialysis device as described in claim 2, wherein said first base member comprises a generally planar bottom with said pair of arms extending upwardly therefrom, a pair of opposed sides extending upwardly only a portion of the distance of extension of said pair of arms, a pair of opposed ends extending upwardly to the same extent as the upward extension of said opposed sides, said opposed ends being parallel to each other and normal to said opposed sides and said generally planar bottom being orthogonal to said opposed sides and said opposed ends, a plurality of transverse ribs extending between said opposed sides to form a rigidified structure, and a generally planar plate overlying said transverse ribs, opposed sides and opposed ends and providing a support for said stack.

7. A dialysis device as described in claim 6, in which said base members and said generally planar plate define openings which communicate with said transverse openings and a dialysate path is formed via said openings and a trough defined by each of said base members.

8. A dialysis device of the type in which a plurality of parallel membrane support plates are stacked and support a plurality of membranes, with the membrane support plates and membranes defining transverse openings for the passage of fluids, the improvement comprising, in combination: a casing enclosing a portion of said stack, said casing comprising a pair of base members which are identical to each other and which are interengaging each other, each of said base members carrying a pair of arms integrally formed therewith and extending from opposite sides of the base member, said side members carried by one of said base members being connected to the other base member and the side members carried by the other base member being connected to said one base member, said base members being movable toward each other during connection of said side members to said base members whereby the distance between said first base member and said second base member may provide a suitable pressure fit on said stack enclosed by said casing.

9. A dialysis device as described in claim 6, wherein said base members are molded and formed of a plastic material.

10. A dialysis device as described in claim 8, in which each of said members is sonically welded to the other base member.

11. A dialysis device as described in claim 9, wherein each of said base members comprises a generally planar bottom with said pair of arms extending upwardly therefrom, a pair of opposed sides extending upwardly only a portion of the distance of extension of said pair of arms, a pair of opposed ends extending upwardly to the same extent as the upward extension of said opposed sides, said opposed ends being parallel to each other, said opposed sides being parallel to each other and normal to said opposed ends and said generally planar bottom being orthogonal to said opposed sides and said opposed ends, a plurality of transverse ribs extending between said opposed sides to form a rigidified structure, and a generally planar plate overlying said transverse ribs, opposed sides and opposed ends and providing a support for said stack.

12. A dialysis device of the type in which a plurality of parallel membrane support plates are stacked and support a plurality of membranes, with the membrane support plates and membranes defining transverse openings for the passage of fluids, the improvement comprising, in combination: a casing enclosing the top, bottom and two opposing sides of said stack, said casing comprising a pair of base members interengaging each other, each of said base members including a plurality of transverse ribs, a pair of opposed sides extending in the same direction as said ribs and a pair of opposed ends extending in the same direction as said ribs, and a rigidifying plate overlying and being connected to said ribs, opposed sides and opposed ends; said base members and said plates defining openings which communicate with said transverse openings, and each of said base members defining a dialysate path trough.

13. A dialysis device as described in claim 12, in which said opposed ends are parallel to each other and are normal to said opposed sides, and said base member having a generally planar bottom which is orthogonal to said opposed sides and said opposed ends.

14. A method of producing a dialysis device including the steps of: forming a pair of identical base members; forming a pair of generally planar plates for supporting a stack of membranes and membrane support plates; ultrasonically scan-welding one of said generally planar plates to one of said base members; ultrasonically scan-welding another of said generally planar plates to the other of said base members; and connecting said one base member to said other base member about said stack.

15. A method of producing a dialysis device as described in claim 14, in which said base members are each formed of plastic material in a ribbed construction and said generally planar plates carry a plurality of energy directors for overlying said ribs, said ultrasonic scan-welding thereby sealing said support plate and said base member.

* * * * *